United States Patent [19]

Vaassen et al.

[11] Patent Number: 5,573,218
[45] Date of Patent: Nov. 12, 1996

[54] APPARATUS FOR THE THREE-DIMENSIONAL ORIENTATION OF AN OBJECT

[75] Inventors: Wilhelmus M. H. Vaassen; Albert Groenenboom, both of Hengelo, Netherlands

[73] Assignee: Hollandse Signaalapparaten B.V., Hengelo, Netherlands

[21] Appl. No.: 392,749

[22] PCT Filed: Sep. 3, 1993

[86] PCT No.: PCT/EP93/02377

§ 371 Date: Mar. 10, 1995

§ 102(e) Date: Mar. 10, 1995

[87] PCT Pub. No.: WO94/07081

PCT Pub. Date: Mar. 31, 1994

[30] Foreign Application Priority Data

Sep. 17, 1992 [NL] Netherlands ............................ 9201609

[51] Int. Cl.$^6$ .................................................. A47G 29/00
[52] U.S. Cl. ............................................. 248/371; 343/882
[58] Field of Search ..................................... 248/371, 393, 248/394, 395, 396, 397, 415, 425, 278.1, 664, 133; 343/880, 882, 883

[56] References Cited

U.S. PATENT DOCUMENTS 5,000,408  3/1991  Bourgeois et al. ................. 343/882 X
5,479,181  12/1995  Simpson ......................... 248/278.1 X

FOREIGN PATENT DOCUMENTS

114588   8/1984   European Pat. Off. .
155922   9/1985   European Pat. Off. .
2562459  11/1985  France .
1042258  9/1966   United Kingdom .

*Primary Examiner*—Ramon O. Ramirez
*Attorney, Agent, or Firm*—Oblon, Spivak, McClelland, Maier & Neustadt, P.C.

[57] ABSTRACT

An apparatus for orienting an object mounted on a first plane, for example a radar antenna, with reference to a second plane, for example the deck of a ship. The apparatus includes a stack of three identical, substantially annular housings each of which is provided with an upper surface and a lower surface, these two surfaces not being parallel. Each housing is provided with a drive unit for rotating the upper surface with respect to the lower surface about the housing axis. The drive units are suitable for independently performing the rotations; furthermore control units are provided for controlling the drive units for orienting the object in three degrees of freedom with reference to the second plane.

13 Claims, 5 Drawing Sheets

APPARATUS FOR THE THREE-DIMENSIONAL ORIENTATION OF AN OBJECT

BACKGROUND OF THE INVENTION

The present invention relates to an apparatus for orientating an object mounted on a first plane with reference to a second plane, comprising a first housing attached to the second plane, a second housing rotatably mounted on the first housing around a first axis n which forms an angle B1 with a normal Z on the second plane, a third housing rotatably mounted on the second housing around a second axis L which forms an angle B2 with the first axis N.

DESCRIPTION OF THE BACKGROUND

An apparatus of this kind is known from EP-B 0,155,922. This patent specification relates to an apparatus for retaining a universal table in a horizontal position and for rotating the radar antenna in a certain azimuth direction.

In the known apparatus the object is rotated in the first plane with the aid of a fourth housing, mounted in the center of the apparatus, which fourth housing also provides for a rotational reference between the first plane and the second plane. The fourth housing, together with additional means, occupies the center of the system, which makes it difficult to pass connecting means like cables and flexible waveguides through it. It moreover makes the overall construction rather complex.

From FR-A 2562459 a robot arm is known in which a number of identical, annularly-shaped housings are used for moving the arm. In this known apparatus all housings mounted onto one housing necessarily rotate together with that one housing.

SUMMARY OF THE INVENTION

The apparatus according to the invention alleviates these disadvantages and is characterised in that the third housing comprises a rotatable upper surface with a third rotation axis M which forms an angle B3 with the second axis L, wherein drive means are provided, arranged to rotate the second housing, the third housing and the rotatable upper surface of the third housing about their respective axis, wherein the angles B1, B2 and B3 are not equal to zero, wherein the first housing, the second housing and the third housing have a substantially annular shape, wherein the drive means comprise a first motor mounted on the first housing, arranged to rotate the second housing with respect to the first housing, a second motor mounted on the second housing, arranged to rotate the third housing with respect to the third housing and wherein angle indicators are provided which are arranged to measure the angular rotation of the second housing, the third housing and the rotatable upper surface of the third housing and wherein control means are provided which are connected to the angle indicators and the motors and which are arranged to control the first and second motor for orientating the first plane with respect to the second plane and to control the third motor for rotating the object in the first plane, thereby compensating for possible rotations introduced by the rotations of the second and third housing in combination.

From FR-A 2562459 a robot arm is known in which a number of identical, annulary-shaped housings are used for moving the arm. In this known apparatus all housings mounted onto one housing necessarily rotate together with that one housing.

A favourable embodiment of the apparatus is characterised in that the housings are substantially identical. A special embodiment of the housing is characterised in that the drive means for each housing comprise a motor connected to the control means, a gear unit and an angle indicator connected to the control means, designed for measuring the angular rotation from a reference position of the upper surface relative to the lower surface.

A favourable embodiment of the control means is characterised in that the control means comprise a module for the determination, out of a test signal vector $\phi$, a reference signal vector $\theta$ and a substructure position vector $\psi$, of an error angle vector $\delta$, comprising azimuth error angle $\delta_a$, the elevation error angle $\delta_e$ and the roll error angle $\delta_r$ between a coordinate system assumed by the object to be positioned and a required coordinate system and a module for the determination, out of the error angle vector $\delta$ of a control signal vector u, for driving the three housings. u is determined by the transfer functions $H_1(s)$, $H_2(s)$ and $H_3(s)$, in which the following applies:

$u_1(s)=H_1(s)\cdot\delta_a(s)$ $u_2(s)=H_2(s)\cdot\delta_e(s)+H_3(s)\cdot\delta_r(s)$ $u_3(s)=H_2(s)\cdot\delta_e(s)-H_3(s)\cdot\delta_r(s)$ $H_1(s)$, $H_2(s)$ and $H_3(s)$ being at least first-order control systems.

BRIEF DESCRIPTION OF THE DRAWINGS

The invention will now be described with reference to the following figures, of which.

DETAILED DESCRIPTION OF THE INVENTION

Figure 1:
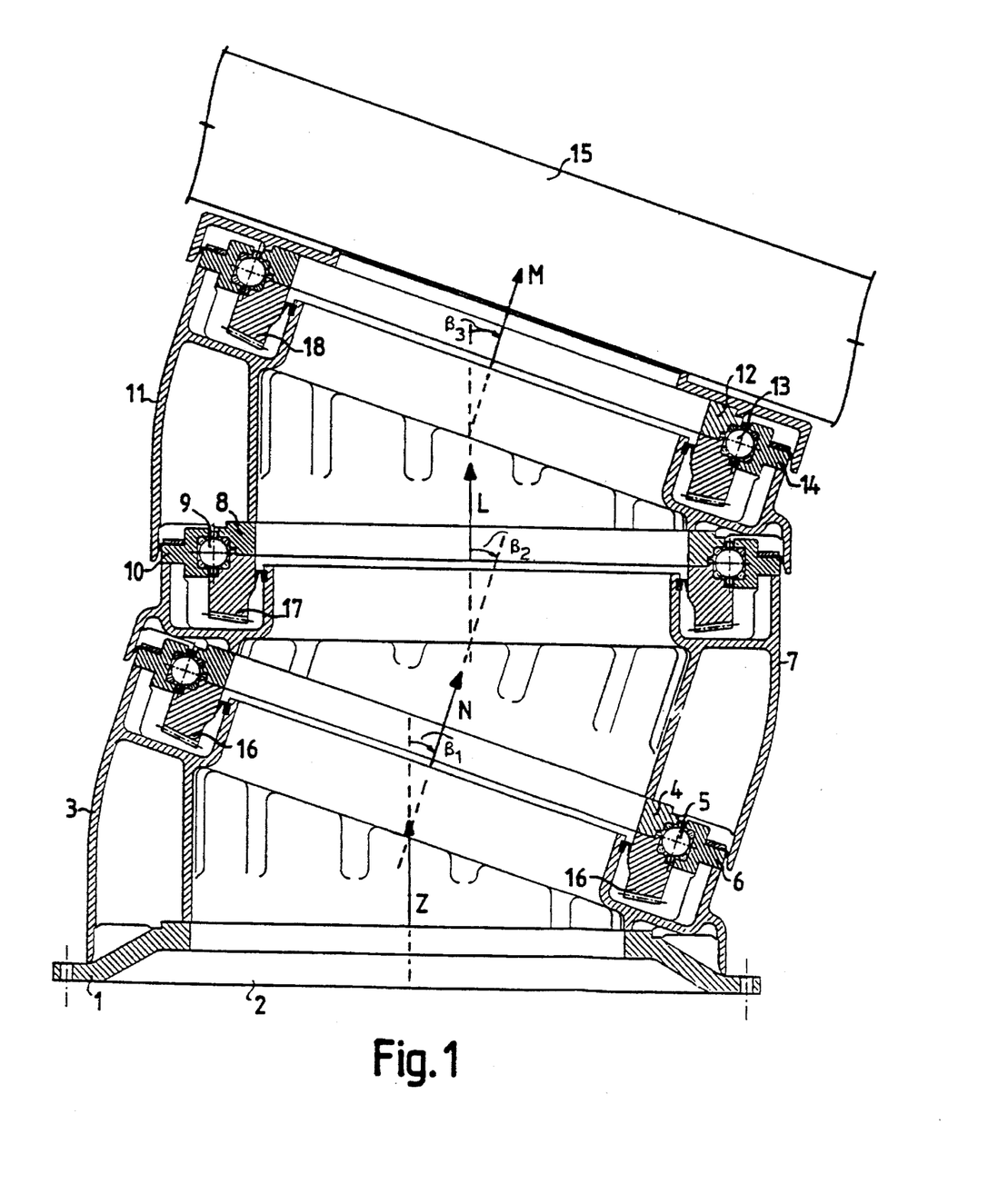
FIG. 1 represents a stack of three housings with an antenna mounted on top.

A longitudinal section of a possible embodiment of an apparatus according to the invention is represented in FIG. 1. The apparatus is intended to be set up on the deck of a ship and to support a radar antenna and cause it to perform a uniform rotation in the horizontal plane, irrespective of ship movements. The exemplifying apparatus is attached to a substructure 2 by means of a fastening ring 1, in this case the deck of the ship. A lower annular housing 3 is fixed in position to the fastening ring 1. An upper surface 4 is rotatably mounted in a bearing 5 in a fastening ring 6, attached to the lower annular housing 3. The rotational axis N of the bearing 5 forms an angle $\beta_1$ with the normal Z of the substructure. An intermediate annular housing 7 is mounted to the upper surface 4. An upper surface 8 is rotatably mounted in a bearing 9 in a fastening ring 10, attached to the intermediate annular housing 7. The rotational axis L of the bearing 9 deviates from the rotational axis N of the bearing 5 by an angle $\beta_2$. In the exemplifying apparatus $\beta_2$ is equal to $\beta_1$, although in alternative embodiments these angles may differ.

An upper annular housing 11 is mounted on the upper surface 8. An upper surface 12 is rotatably mounted in a bearing 13 in a fastening ring 14, attached to the upper annular housing 11. The rotational axis M of the bearing 13 deviates from the rotational axis L of the bearing 9 by an angle $\beta_3$. In the exemplifying apparatus the angles $\beta_3$ and $\beta_2$ are alike, but in alternative embodiments these angles may differ. An object 15, for example a radar antenna, is mounted on top of the rotatable upper surface 12.

By rotating the upper surface 4, the upper surface 8 and the upper surface 12 in their bearings it is not only possible to give the rotational axis M of the bearing 13 any desired direction in relation to the normal Z within the limits of the positioning range of the apparatus, but also to cause the upper surface 12 to assume any desired angular position with respect to the rotational axis M. Thus, it is possible to position the object 15, mounted on the upper surface 12 in a three dimensions.

In an alternative embodiment of the apparatus, the upper surface 4, the upper surface 8 and the upper surface 12, of the lower annular housing 3, the intermediate annular housing 7 and the upper annular housing 11 are driven by a gear ring 16, a gear ring 17 and a gear ring 18 respectively. Each gear ring is driven by a drive shaft, provided with a pinion which meshes with this gear ring and which is connected to a drive means which forms part of a servo system. The drive means are not illustrated in this figure.

In the embodiment according to the invention the drive means are electric motors, but it is also possible to incorporate other types of drive means, such as hydraulic motors. The gear ring associated to each top surface can also be used for driving an angle indicator. Another possibility is to mount the angle indicator directly on the drive shaft of the relevant drive means, or to integrate the angle indicator with the rotatable upper surface, for example by applying a Gray-code to the underside of the upper surface and a reading device to the lower surface. The angle indicators are also connected to the servo system, which is suitable for positioning the upper surface 4, the upper surface 8 and the upper surface 12, using said drive means. For determining the angular position, digital optical angle indicators shall preferably be used, these being highly accurate and capable of being directly connected to the servo system, which is generally of the digital type.

In an alternative embodiment, stepping motors are used as drive means, as a result of which the angle indicators may be omitted. In stepping motors, the angular rotation per step is exactly defined, so that it suffices to detect only the initial position at the upper surfaces for which purpose a mechanical or optical switching element may be used.

The apparatus according to the invention comprises a housing with a rotatable upper surface. Another possibility, however, is to construct the lower surface of one or more housings rotatably. In alternative embodiments the rotatable upper or lower surface of one or more housings can be integrated with the next housing mounted to the relevant upper or lower surface. The only condition is that two adjacent housings are rotatable with respect to one another about an axis which is preferably perpendicular to two adjacent surfaces of these housings.

The apparatus according to a special embodiment of the invention incorporates a servo circuit which minimizes the so-called error angles in azimuth, elevation or roll angle of the upper surface with respect to a fixed or moving reference system, by the correct combined controlling of the driving means.

A well-known method for determining the angular errors is to mount gyros on top of the upper surface 12. An advantage of this method is its simplicity. Essential drawbacks of this method are, however, that it entails considerable cost and requires additional provisions.

A superior method for determining the angular errors will be discussed below, using the conversion formulas relevant to coordinate systems.

First, the following time-dependent vectors are inserted, which are defined as follows:

$$\underline{u} = \begin{bmatrix} u_1 \\ u_2 \\ u_3 \end{bmatrix} \quad \underline{r} = \begin{bmatrix} r_a \\ r_e \\ r_r \end{bmatrix} \quad \underline{\delta} = \begin{bmatrix} \delta_a \\ \delta_e \\ \delta_r \end{bmatrix} \quad \underline{\phi} = \begin{bmatrix} \phi_1 \\ \phi_2 \\ \phi_3 \end{bmatrix}$$

$$\underline{\theta} = \begin{bmatrix} \theta_a \\ \theta_e \\ \theta_r \end{bmatrix} \quad \underline{\psi} = \begin{bmatrix} \psi_a \\ \psi_e \\ \psi_r \end{bmatrix} \quad \underline{\phi}_w = \begin{bmatrix} \phi_{w1} \\ \phi_{w2} \\ \phi_{w3} \end{bmatrix}$$

The following designations are used:

u=drive signal vector r=control signal vector $\delta$=error angle vector $\phi$=test signal vector $\theta$=reference signal vector $\psi$=substructure position vector $\phi_w$=desired angle vector.

The drive signal vector u comprises a drive signal $u_1$ for controlling the drive means of the rotatable upper surface of the lower housing, a drive signal $u_2$ for controlling the drive means of the rotatable upper surface of the intermediate housing and a drive signal $u_3$ for controlling the drive means of the rotatable upper surface of the upper housing, the drive signals being proportional to the torques to be supplied by the drive means.

A control signal vector r comprises an azimuth-control signal $r_a$, an elevation control signal $r_e$ and a roll control signal $r_r$. Upon several arithmetical operations, the control signal vector is converted into a drive signal vector.

The test signal vector $\phi$ comprises the measured angular rotation $\phi_1$ measured from a reference position of the rotatable upper surface of the lower housing, the angular rotation $\phi_2$ measured from a reference position of the rotatable upper surface of the intermediate housing and the measured angular rotation $\phi_3$ from a reference position of the rotatable upper surface of the upper housing.

The reference signal vector $\theta$ comprises three reference signals, viz. the azimuth angle $\theta_a$, the elevation angle $\theta_e$ and the roll angle $\theta_r$ between a desired coordinate system and for example an earth-fixed reference coordinate system.

The substructure position vector $\psi$ comprises the azimuth angle $\psi_a$, the elevation angle $\psi_e$ and the roll angle $\psi_r$ of a coordinate system related to the substructure on which the apparatus is mounted, with respect to the reference coordinate system.

The error angle vector $\delta$ comprises the azimuth error angle $\delta_a$, the elevation error angle $\delta_e$ and the roll error angle $\delta_r$ between a coordinate system related to the object to be positioned and the desired coordinate system.

The desired angle vector $\phi_w$ comprises the desired values of $\phi$.

Figure 2:
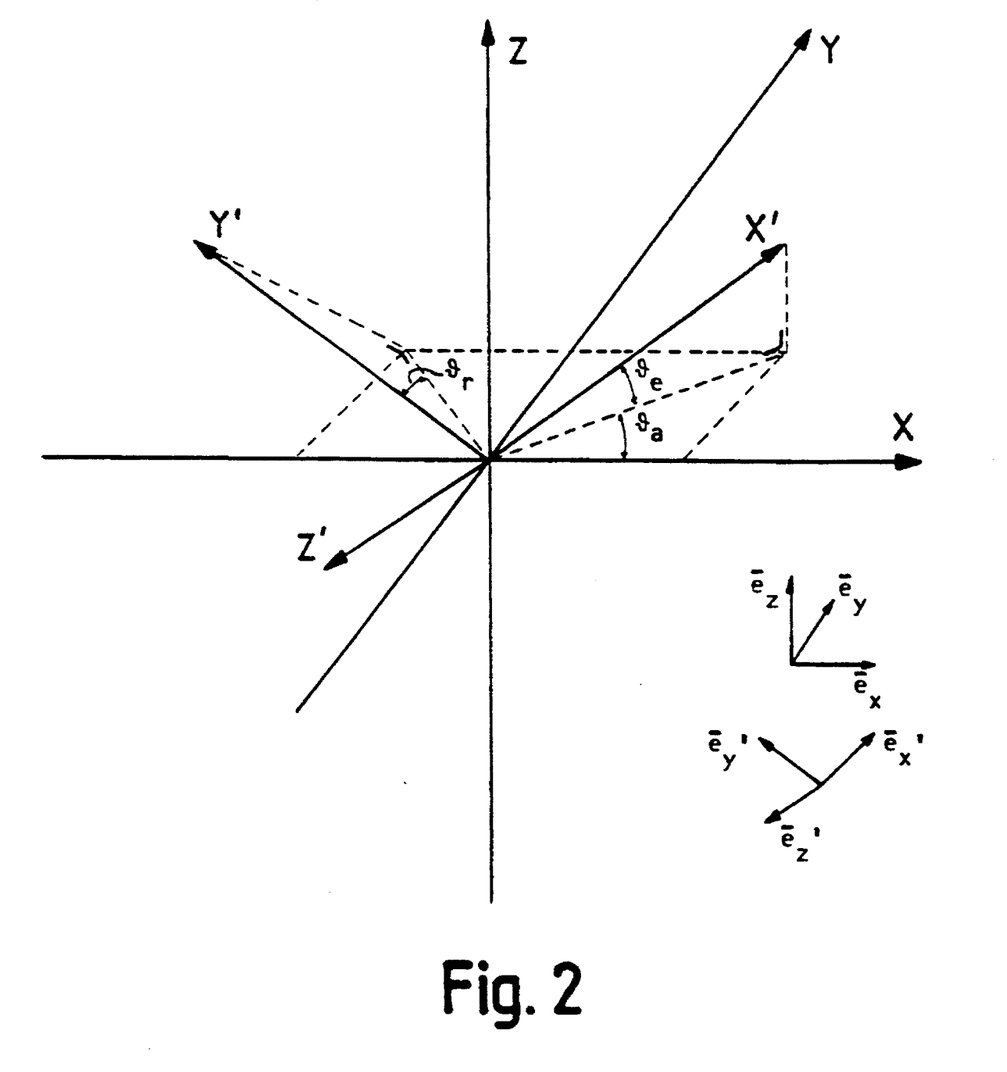
FIG. 2 illustrates two coordinate systems three-dimensionally rotated with respect to each other, by their mutual angles.

FIG. 2 represents two coordinate systems, which serve to exactly define the three angles which determine the position of a body, for example the object to be positioned, with respect to a reference, which may be the deck of a ship, an earth-fixed reference or a desired position. The coordinate system XYZ related to the reference is called the reference system and the coordinate system X'Y'Z' related to said body is called the body-fixed system. Each coordinate system is determined by three basic vectors, for example XYZ by $$E=(\bar{e}_x, \bar{e}_y, \bar{e}_z).$$

These vectors are selected to have length one, to be at right angles with respect to each other and to constitute a clockwise system. The figure represents the three angles $\theta_1$, $\theta_2$ and $\theta_3$ which determine the position of said body with respect to the reference. They are defined as:

$\theta_a$=azimuth angle
$\theta_e$=elevation angle
$\theta_r$=roll angle.

$\theta_a$, $\theta_e$ and $\theta_r$ are defined such that, if the coordinate system XYZ is to be rotated such that X points in the direction of X', Y points in the direction of Y' and Z points in the direction of Z'; such can be realised by first rotating the X and Y axis in a clockwise direction about the Z axis while looking in the direction of this axis through the azimuth angle $\theta_a$, by subsequently rotating the X and Z axis in a counter-clockwise direction about the Y axis while looking in the direction of this axis through the elevation angle $\theta_e$, and by finally rotating the Y and Z axis in a clockwise direction about the X axis while looking in the direction of this axis through the roll angle $\theta_r$. This method enables the relation between the clockwise orthonormal basis $$E'=(\bar{e}_x, \bar{e}_y, \bar{e}_z)$$

related to the coordinate system X'Y'Z' to be expressed in E. As known, this is possible by multiplying E on the right by a rotation matrix $R(\theta_r,\theta_e,\theta_a)$, which is the product of three rotation matrices $R_a(\theta_a)$, $R_e(\theta_e)$ and $R_r(\theta_r)$. With the given definition of $\theta_a$, $\theta_e$ and $\theta_r$ this formula can be expressed as follows:

$$E'=E \cdot R_r(\theta_r) \cdot R_e(\theta_e) \cdot R_a(\theta_a) = E \cdot R(\theta_r,\theta_e,\theta_a)$$

with:

$$R_a(\theta_a) = \begin{bmatrix} \cos\theta_a & -\sin\theta_a & 0 \\ \sin\theta_a & \cos\theta_a & 0 \\ 0 & 0 & 1 \end{bmatrix}$$

$$R_e(\theta_e) = \begin{bmatrix} \cos\theta_e & 0 & -\sin\theta_e \\ 0 & 1 & 0 \\ \sin\theta_e & 0 & \cos\theta_e \end{bmatrix}$$

$$R_r(\theta_r) = \begin{bmatrix} 1 & 0 & 0 \\ 0 & \cos\theta_r & -\sin\theta_r \\ 0 & \sin\theta_r & \cos\theta_r \end{bmatrix}$$

For determining the error angles, use is also made of the solution of:

$$R(\theta_r, \theta_e, \theta_a) = R_o \quad (1)$$

in which $R_o$ represents a known rotation matrix and $\theta_r$, $\theta_e$, $\theta_a$ have to be solved. $R_o$ is represented by:

$$R_o = \begin{bmatrix} r_{11} & r_{12} & r_{13} \\ r_{21} & r_{22} & r_{23} \\ r_{31} & r_{32} & r_{33} \end{bmatrix} \quad (2)$$

Two solutions can be distinguished for $\theta_r$, $\theta_e$ and $\theta_a$:

$$\theta_r = -\text{atan2}(r_{23}, r_{33}) \quad (3)$$

$$\theta_e = -\text{asin}(r_{13}) \quad (4)$$

$$\theta_a = -\text{atan2}(r_{12}, r_{11}) \quad (5)$$

and $$\theta_r = \pi - \text{atan2}(r_{23}, r_{33}) \quad (6)$$

$$\theta_e = \pi + \text{asin}(r_{13}) \quad (7)$$

$$\theta_a = \pi - \text{atan2}(r_{12}, r_{11}) \quad (8)$$

atan2 representing the four quadrant arc tangent and asin the arc sine line limited between $-\pi/2$ and $\pi/2$.

Figure 3A:
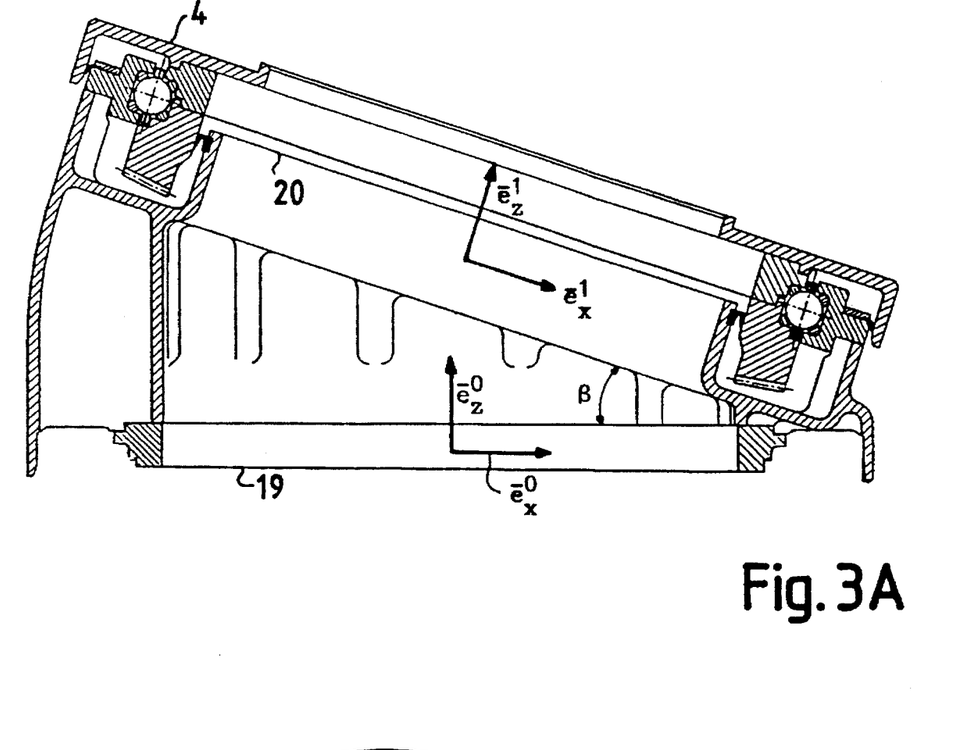
FIG. 3A represents an example of a housing according to the invention.
Figure 3B:
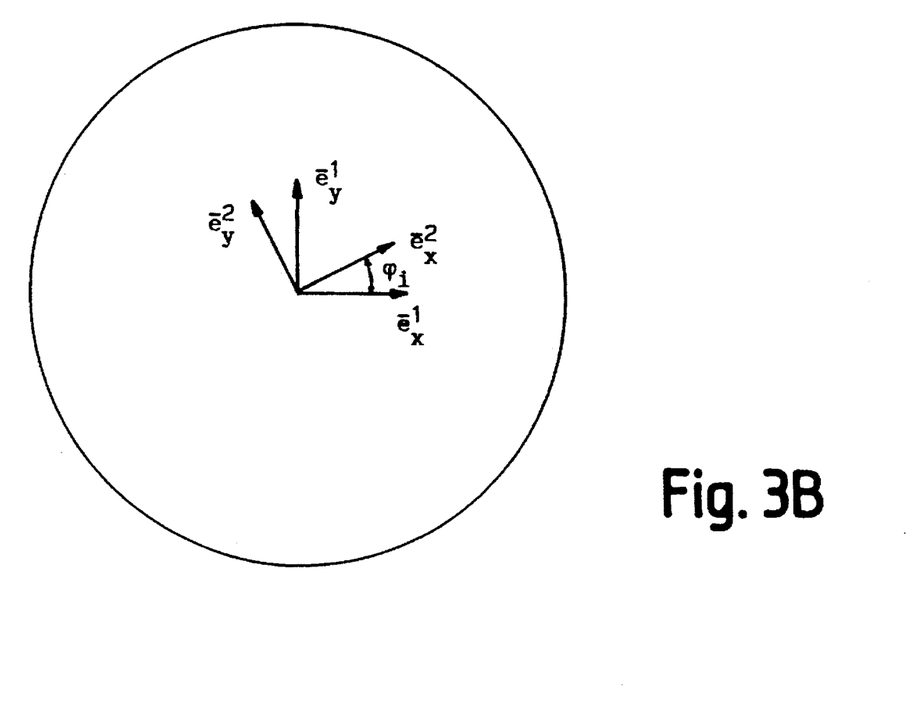
FIG. 3B represents the top view of a housing according to the invention.

The method for converting coordinate systems, related to a housing in the apparatus according to the invention, will now be described with reference to FIG. 3A and FIG. 3B. FIG. 3A represents an example of a housing with a lower surface 19, an upper surface 20 and a rotatable upper surface 4. The rotatable upper surface 4 is parallel to the upper surface 20 and constitutes an angle β with the lower surface 19. A clockwise orthonormal basis $E^0$ is related to the lower surface 19, consisting of the vectors $\bar{e}_x^0$, $\bar{e}_y^0$ and $\bar{e}_z^0$, which have been definied with reference to a known coordinate system E, for example an earth-fixed system. In this figure, $\bar{e}_z^0$ is perpendicular to the lower surface 19, and $\bar{e}_y^0$ is perpendicular to the plane of the drawing. An orthonormal basis $E^1$ is related to the upper surface 20, consisting of the vectors $\bar{e}_x^1$, $\bar{e}_y^1$ and $\bar{e}_z^1$, defined with reference to known coordinate system E. In this situation $\bar{e}_z^1$ is perpendicular to the upper surface 20 and $\bar{e}_y^1$ is parallel to $\bar{e}_y^0$. $\bar{e}_y^1$ and $\bar{e}_y^0$ both point in the same direction away from the observer. $\bar{e}_x^0$ and $\bar{e}_x^1$ are both situated in the plane of the drawing. An orthonormal basis $E^2$ is related to the rotatable upper surface 4, consisting of the vectors $\bar{e}_x^2$, $\bar{e}_y^2$ and $\bar{e}_z^2$, defined with reference to known coordinate system E. In this situation $\bar{e}_z^2$ is perpendicular to the rotatable upper surface 4 and consequently coincides with $\bar{e}_z^1$. FIG. 3B shows that the base vectors $\bar{e}_x^2$, $\bar{e}_y^2$ related to the rotatable upper surface 4 form an angle $\phi_i$ with the base vectors $\bar{e}_x^1$, $\bar{e}_y^1$ related to the upper surface 20. Then the following applies:

$$\bar{e}_x^2 = \bar{e}_x^1 \cdot \cos\phi_i + \bar{e}_y^1 \cdot \sin\phi_i + \bar{e}_z^1 \cdot 0 \quad (9)$$

$$\bar{e}_y^2 = -\bar{e}_x^1 \cdot \sin\phi_i + \bar{e}_y^1 \cdot \cos\phi_i + \bar{e}_z^1 \cdot 0 \quad (10)$$

$$\bar{e}_z^2 = \bar{e}_x^1 \cdot 0 + \bar{e}_y^1 \cdot 0 + \bar{e}_z^1 \quad (11)$$

In matrix notation this is:

$$E^2 = E^1 \cdot \begin{bmatrix} \cos\phi_i & -\sin\phi_i & 0 \\ \sin\phi_i & \cos\phi_i & 0 \\ 0 & 0 & 1 \end{bmatrix} = E^1 \cdot R_a(\phi_i) \quad (12)$$

Analogous to the above, the basis $E^1$ can be expressed in the basis $E^0$:

$$E^1 = E^0 \cdot \begin{bmatrix} \cos\beta & 0 & \sin\beta \\ 0 & 1 & 0 \\ -\sin\beta & 0 & \cos\beta \end{bmatrix} = E^0 \cdot R_e(\beta) \quad (13)$$

and as a consequence $$E^2 = E^0 \cdot R_e(\beta) \cdot R_a(\phi_i). \quad (14)$$

In a stack of three housings, it will now be possible to express, under the repeated application of the correct rotation matrices, an orthonormal basis $E_b$, related to the rotatable upper surface 4 of the upper housing in an orthonormal bais $E_o$, related to the lower surface of the lower housing. This yields:

$$\begin{aligned} E_b &= E_o \cdot R_e(\beta) \cdot R_a(\phi_1) \cdot R_e(-\beta) \cdot R_a(\phi_2) \cdot R_e(\beta) \cdot R_a(\phi_3) \quad (15) \\ &= E_o \cdot Q(\beta,\phi_1,\phi_2,\phi_3) \end{aligned}$$

In order to define the error angles of the rotatable upper surface of the upper housing and consequently the error angles of the object placed on top of it, the required coordinate system $E_w$ is introduced. This enables the error angles to be defined as the azimuth, elevation and roll angle between the coordinate system coupled to the rotatable upper surface of the upper housing and the required coordinate system.

Analogous to the above it will now be possible to express the required coordinate system in $E_o$:

$$E_w = E_o \cdot R_r(\theta_r) \cdot R_e(\theta_e) \cdot R_a(\theta_a) = E_o \cdot R(\theta_r, \theta_e, \theta_a) \quad (16)$$

and to express $E_r$ in $E_w$:

$$\begin{aligned} E_r &= E_w \cdot R_r(\delta_r) \cdot R_e(\delta_e) \cdot R_a(\delta_a) = E_w \cdot R(\delta_r, \delta_e, \delta_a) \quad (17) \\ &= E_o \cdot R(\theta_r, \theta_e, \theta_a) \cdot R(\delta_r, \delta_e, \delta_a). \end{aligned}$$

This results in a formulation of the error angles:

$$R(\delta_r, \delta_e, \delta_a) = R^{-1}(\theta_r, \theta_e, \theta_a) \cdot Q(\beta, \phi_1, \phi_2, \phi_3) \quad (18)$$

This formulation constitutes a system of nine dependent equations with the three unknown error angles $\delta_a$, $\delta_e$ and $\delta_r$.

Since the right-hand side is a known rotation matrix, it is possible to derive the two solution combinations for the error angles $\delta_a$, $\delta_e$ and $\delta_r$. The most obvious conclusion is to select the combination which, being in a fixed initial position, yields angular error values zero.

An obvious method for mounting the apparatus according to the invention on a ship's deck is that in which the coordinate system $E^0$, coupled to the lower surface of the lower housing is orientated such that $E^0$ coincides with the so-called ship-fixed reference system. This ship-fixed reference system is a clockwise coordinate system, coupled to the ship which serves as a reference to indicate the ship's position in azimuth, elevation and roll angle with respect to an earth-fixed (e.g. north-orientated clockwise) coordinate system. In actual practice, these position angles will be measured by means of gyros. If this method is employed, it is possible to simply express $E_b$ in the earth-fixed system by allowing for the ship's azimuth, elevation and roll angle. If $\psi_a$ symbolizes the elevation angle, $\psi_e$ the elevation angle and $\psi_r$ the roll angle, then:

$$E_b = E_a \cdot R_r(\psi_r) \cdot R_e(\psi_e) \cdot R_a(\psi_a) \cdot Q(\beta, \phi_1, \phi_2, \phi_3). \quad (19)$$

The required coordinate system with respect to the earth-fixed system is expressed by:

$$E_w = E_a \cdot R_r(\theta_r) \cdot R_e(\theta_e) \cdot R_a(\theta_a) = E_a \cdot R(\theta_r, \theta_e, \theta_a) \quad (20)$$

and $E_r$ will then be expressed in $E_w$ by:

$$\begin{aligned} E_r &= E_w \cdot R_r(\delta_r) \cdot R_e(\delta_e) \cdot R_a(\delta_a) = E_w \cdot R(\delta_r, \delta_e, \delta_a) \quad (21) \\ &= E_a \cdot R(\theta_r, \theta_e, \theta_a) \cdot R(\delta_r, \delta_e, \delta_a) = E \cdot R(\psi_r, \psi_e, \psi_a) \cdot Q(\beta, \phi_1, \phi_2, \phi_3). \end{aligned}$$

This results in a formula for the error angles:

$$R(\delta_r, \delta_e, \delta_a) = R^{-1}(\theta_r, \theta_e, \theta_a) \cdot R(\psi_r, \psi_e, \psi_a) \cdot Q(\beta, \phi_1, \phi_2, \phi_3). \quad (22)$$

The advantage of allowing for the ship's position with respect to an earth-fixed system is that it directly enables the rotatable upper surface of the upper housing to assume a random position, expressed by $\theta_r$, $\theta_e$ and $\theta_a$ with respect to the earth-fixed system by controlling the drive means in such a way that $\delta_r$, $\delta_e$ and $\delta_a$ become practically zero. In case the apparatus is used to stabilize a radar on a ship, which radar is required to performs perfectly uniform rotation with respect to an earth-fixed system, $\theta_r = \theta_e = 0$ and $\delta_a = \omega \cdot t$ is to be selected, t representing time and $\omega$ the required angular velocity with respect to the earth-fixed system.

It is indeed possible for $E^0$ not to coincide with the ship reference system. The error angles can then be calculated in a way analogous to the above calculation method by taking into account the orientation of $E^0$ with respect to the ship reference system.

By putting the error angles to zero (22) yields an implicit formula for the desired values of $\phi_1$, $\phi_2$ and $\phi_3$:

$$Q(\beta, \phi_{w1}, \phi_{w2}, \phi_{w3}) = R^{-1}(\psi_r, \psi_e, \psi_a) \cdot R(\theta_r, \theta_e, \theta_a). \quad (23)$$

The number of solutions to this equation depends on the angle between M and N. If this angle is zero, the number of solutions is infinite. If the angle is narrower than $\beta_2 + \beta_3$ there are two solutions; if the angle equals $\beta_2 + \beta_3$ there is one solution. If the angle is wider than $\beta_2 + \beta_3$ there are no solutions. During normal operation of the apparatus, it shall be ascertained that the stated angle remains strictly between zero and $\beta_2 + \beta_3$. Thus it is possible, in a consistent way, to select one of the two solutions at any given moment. In this respect, the word consistent means that the selected solution is a continuous function of time if the input quantities are continuous functions of time. A method for ensuring that the angle between M and N remains wider than zero and narrower than $\beta_2 + \beta_3$ is to introduce stop means. An incidental advantage of this method is that the housings provided with stop means are prevented from rotating more than 360°. This is relevant with a view to the possible presence of cables between ship and housing, for instance required for the power supply of the driving means.

Figure 4:
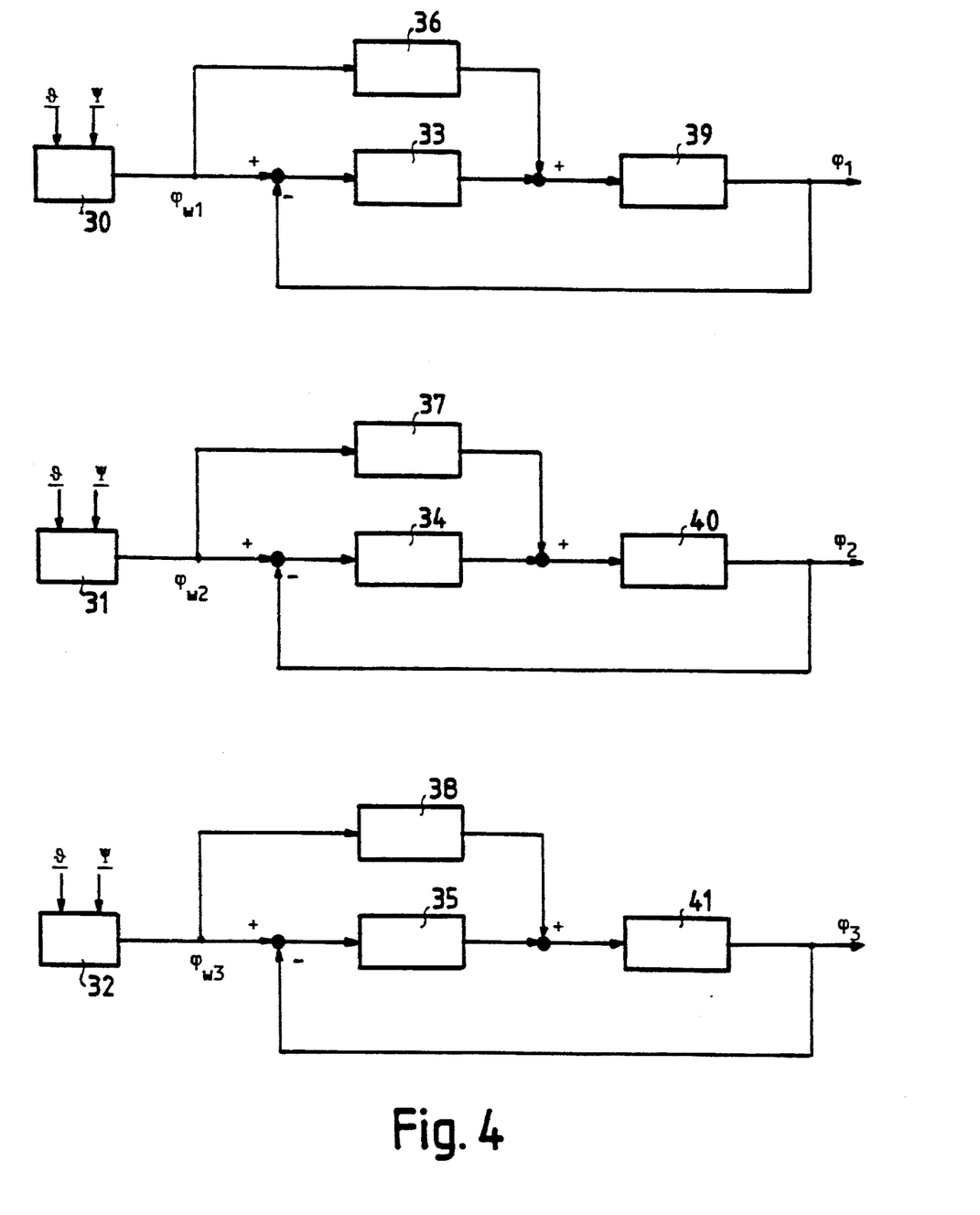
FIG. 4 represents the servo section of a possible embodiment of the apparatus according to the invention.

This results in a first special embodiment of the drive means in the apparatus according to the invention. This embodiment is further illustrated in FIG. 4. The drive means comprise three independent servo circuits. The desired values $\phi_{w1}$, $\phi_{w2}$ and $\phi_{w3}$ are determined by means of (23). The servo circuits comprise the drive means 39 of the lower housing, the drive means 40 of the centre housing and the drive means 41 of the upper housing. Each servo circuit is provided with linear controllers 33, 34 and 35 which shall be at least of the first order. If necessary, a feed forward coupling 36 and/or 37 and/or 38 may be included.

A second, most advantageous embodiment of the servo part of the apparatus according to the invention employs a non-linear decoupling controller. This non-linear decoupling controller enables, as opposed to the control torques $u_1$, $u_2$ and $u_3$, the generation of three new control quantities $r_a$, $r_e$ and en $r_r$ characterised in that, provided the formulas of motion (dynamic model) pertaining to the apparatus according to the invention are known to a sufficient extent, $r_a$ mainly affects $\delta_a$ only, $r_e$ mainly affects $\delta_e$ only and $r_r$ mainly affects $\delta_r$ only. Thus the interaction among the control quantities has practically disappeared. Submitting $\delta_a$, $\delta_e$, $\delta_r$ and $r_a$, $r_e$, $r_r$ to appropriate arithmetical calculations, yields, at any given moment, the correct $u_1$, $u_2$ and $u_3$ which effect the decoupling. If the arithmetical calculations are executed, the relation between the error angles $\delta_i$ and the control quantities $r_i$ can be presented as:

$$\delta_i = r_i + \xi_i \quad (i = a, e \text{ of } r) \tag{24}$$

$\xi_i$ representing a rest term which represents inaccuracies in the dynamic model of the apparatus according to the invention.

On the basis of this new control quantity $r_i$, it is possible to design an individual linear controller $H_i(s)$ for each error angle, thus obtaining three decoupled servo circuits, represented by:

$$r_i(s) = H_i(s) \cdot \delta_i(s) \quad (i = a, e \text{ or } r) \tag{25}$$

In this formula s is the Laplace operator.

In the servo algorithm $H_i(s)$ are determined in advance. An adaptive algorithm is however also possible.

A substantial advantage of this decoupling is that the bandwidth of each individual servo circuit can be adjusted separately.

In a most advantageous embodiment of the apparatus according to the invention the control values r are submitted to the following arithmetical calculations in order to obtain u.

The usual procedures pertaining to vector differentiation are observed in the following definition, for example $$\frac{\partial \underline{\delta}}{\partial \underline{\phi}} = \begin{bmatrix} \frac{\partial \delta_a}{\partial \phi_1} & \frac{\partial \delta_a}{\partial \phi_2} & \frac{\partial \delta_a}{\partial \phi_3} \\ \frac{\partial \delta_e}{\partial \phi_1} & \frac{\partial \delta_e}{\partial \phi_2} & \frac{\partial \delta_e}{\partial \phi_3} \\ \frac{\partial \delta_r}{\partial \phi_1} & \frac{\partial \delta_r}{\partial \phi_2} & \frac{\partial \delta_r}{\partial \phi_2} \end{bmatrix} \tag{26}$$

$$\frac{\partial^2 \underline{\delta}}{\partial \underline{\phi}^2} = \begin{bmatrix} \frac{\partial^2 \delta_a}{\partial \phi_1^2} & \frac{\partial^2 \delta_a}{\partial \phi_1 \partial \phi_2} & \frac{\partial^2 \delta_a}{\partial \phi_1 \partial \phi_3} & \frac{\partial^2 \delta_a}{\partial \phi_2 \partial \phi_1} & \frac{\partial^2 \delta_a}{\partial \phi_2^2} & \frac{\partial^2 \delta_a}{\partial \phi_2 \partial \phi_3} & \frac{\partial^2 \delta_a}{\partial \phi_3 \partial \phi_1} & \frac{\partial^2 \delta_a}{\partial \phi_3 \partial \phi_2} & \frac{\partial^2 \delta_a}{\partial \phi_3^2} \\ \frac{\partial^2 \delta_e}{\partial \phi_1^2} & \frac{\partial^2 \delta_e}{\partial \phi_1 \partial \phi_2} & \frac{\partial^2 \delta_e}{\partial \phi_1 \partial \phi_3} & \frac{\partial^2 \delta_e}{\partial \phi_2 \partial \phi_1} & \frac{\partial^2 \delta_e}{\partial \phi_2^2} & \frac{\partial^2 \delta_e}{\partial \phi_2 \partial \phi_3} & \frac{\partial^2 \delta_e}{\partial \phi_3 \partial \phi_1} & \frac{\partial^2 \delta_e}{\partial \phi_3 \partial \phi_2} & \frac{\partial^2 \delta_e}{\partial \phi_3^2} \\ \frac{\partial^2 \delta_r}{\partial \phi_1^2} & \frac{\partial^2 \delta_r}{\partial \phi_1 \partial \phi_2} & \frac{\partial^2 \delta_r}{\partial \phi_1 \partial \phi_3} & \frac{\partial^2 \delta_r}{\partial \phi_2 \partial \phi_1} & \frac{\partial^2 \delta_r}{\partial \phi_2^2} & \frac{\partial^2 \delta_r}{\partial \phi_2 \partial \phi_3} & \frac{\partial^2 \delta_r}{\partial \phi_3 \partial \phi_1} & \frac{\partial^2 \delta_r}{\partial \phi_3 \partial \phi_2} & \frac{\partial^2 \delta_r}{\partial \phi_3^2} \end{bmatrix} \tag{27}$$

The direct square of a vector is given by:

$$\underline{\phi}^2 = [\phi_1^2 \; \phi_1\phi_2 \; \phi_1\phi_3 \; \phi_2\phi_1 \; \phi_2^2 \; \phi_2\phi_3 \; \phi_3\phi_1 \; \phi_3\phi_2 \; \phi_3^2]^T \tag{28}$$

In conformity with the above definitions and arithmetical methods pertaining to vector differentiation, said decoupling is effected by submitting the control values r, the error angles $\delta$ and the measured angles $\phi$ to the following calculation, resulting in the control torque values for the three drive means u.

$$\underline{u} = M(\underline{\phi}) \cdot \left[ \frac{\partial \underline{\delta}}{\partial \underline{\phi}} \right]^{-1} \cdot \left\{ \underline{r} - 2 \frac{\partial^2 \underline{\delta}}{\partial \underline{\phi} \partial t} \cdot \underline{\dot{\phi}} - \frac{\partial^2 \underline{\delta}}{\partial \underline{\phi}^2} \cdot \underline{\dot{\phi}}^2 - \frac{\partial^2 \underline{\delta}}{\partial t^2} \right\} + \underline{h}(\underline{\phi}, \underline{\dot{\phi}}, t) \tag{29}$$

In this formula $M(\phi)$ is the mass matrix of the assembly of the centre housing 7 mounted on the rotatable upper surface of the lower housing, the upper housing 11 and the object 15 mounted on the rotatable upper surface of the upper housing. An expression for $M(\phi)$ can be found by drawing up an expression for the kinetic energy of assembly 7, 11, 15 during standstill of the lower housing and by rendering the result as $$T = \tfrac{1}{2} \underline{\dot{\phi}} \cdot M(\underline{\phi}) \cdot \underline{\dot{\phi}}^T. \tag{30}$$

The law of mechanics prove that this is always possible. The mass matrix can thus beforehand be analytically determined as a function of $\phi$ and can as such be implemented in a control-algorithm. A formulation for $h(\phi,\dot{\phi},t)$ can be found by deriving the formulas of motion of assembly 7, 11, 15 during standstill of the lower housing. These formulas of motion result from the Euler-Lagrange equations:

$$M(\underline{\phi}) \cdot \underline{\ddot{\phi}} + \underline{h}(\underline{\phi}, \underline{\dot{\phi}}, t) = \underline{u} \tag{31}$$

Figure 5:
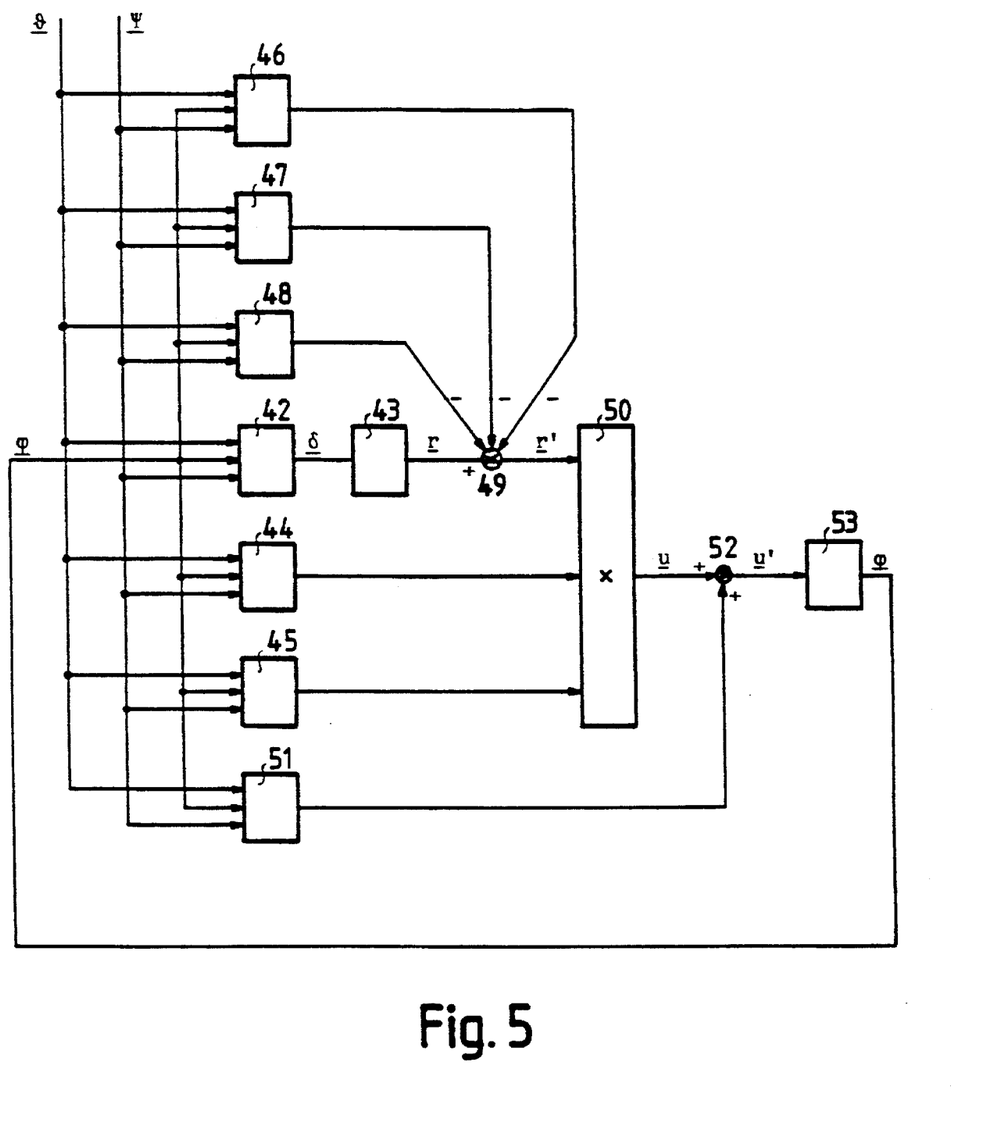
FIG. 5 represents a second, exceptionally advantageous embodiment of the servo section of the apparatus.

The resulting control algorithm is presented in the block diagram of FIG. 5. The algorithm comprises a module 42 which determines the error angle vector $\delta$ from the measuring signal vector $\phi$, the substructure position vector $\psi$ and the reference signal vector $\theta$. To this end (1) through (18) can be used. The algorithm further comprises a module 43 which determines from the error angle vector $\delta$ three control signals $r_r$, $r_e$ and $r_a$, incorporated in the vector r, by applying at least first-order calculations to the error angle vector $\delta$. The algorithm further comprises a module 44 which determines the matrix $$\left[ \frac{\partial \underline{\delta}}{\partial \underline{\phi}} \right]^{-1}$$

and a module 45 which determines the mass matrix M(φ) of the assembly of the centre housing 7, the upper housing 11 and the object 15 mounted on the rotatable upper surface of the upper housing. The algorithm possibly comprises a module 46 which determines the derivative $\underline{x_1} = \dfrac{\partial^2 \underline{\delta}}{\partial t^2}$, a module 47 which determines $\underline{x_2} = \dfrac{\partial^2 \underline{\delta}}{\partial \phi \, \partial t} \cdot \dot{\phi}$ and a module 48 which determines $\underline{x_3} = 2 \cdot \dfrac{\partial^2 \underline{\delta}}{\partial \phi^2} \cdot \dot{\phi}^2$ In 49, $x_1$, $x_2$ and $x_3$ are subtracted from r, resulting in control vector r'. Subsequently the product $$\underline{u}' = M(\phi) \cdot \left[ \dfrac{\partial \underline{\delta}}{\partial \underline{\phi}} \right]^{-1} \cdot \underline{r}'$$

is determined in 50.

If necessary, the rest term h(φ, φ̇, t) can be determined in a module 51 to be added to u' in 52. The result u consists of the control torques for the drive means 53 of the lower, the centre and the upper housing.

The modules formed can all be programmed in a digital calculator using a higher programming language, for example C.

We claim:

1. Apparatus for orientating an object mounted on a first plane with reference to a second plane, comprising:

a first housing attached to the second plane;

a second housing rotatably mounted on the first housing around a first axis N which forms an angle B1 with a normal Z on the second plane;

a third housing rotatably mounted on the second housing around a second axis L which forms an angle B2 with the first axis N, wherein the third housing comprises a rotatable upper surface with a third rotation axis M which forms an angle B3 with the second axis L and wherein the first housing, the second housing and the third housing have a substantially annular shape;

drive means, arranged to rotate the second housing, the third housing and the rotatable upper surface of the third housing about their respective axes, wherein the angles B1, B2 and B3 are not equal to zero, and wherein the drive means comprises:

a first motor mounted on the first housing, arranged to rotate the second housing with respect to the first housing, a second motor mounted on the second housing, arranged to rotate the third housing with respect to the second housing, and a third motor mounted on the third housing, arranged to rotate the upper surface of the third housing with respect to the third housing;

angle indicators for measuring the angular rotation of the second housing, the third housing and the rotatable upper surface of the third housing; and control means connected to the angle indicators and the first, second and third motors for controlling the first and second motor for orientating the first plane with respect to the second plane and for controlling the third motor for rotating the object in the first plane, thereby compensating for possible rotations introduced by the rotations of the second and third housing in combination.

2. Apparatus as claimed in claim 1, wherein the drive means further comprises:

first, second and third gear units, arranged to drive the second housing, the third housing and the rotatable upper surface of the third housing, respectively.

3. Apparatus as claimed in claim 1, wherein the angles B1, B2 and B3 are substantially identical.

4. Apparatus as claimed in claim 1, wherein the first, second and third housings are substantially identical.

5. Apparatus as claimed in claim 1, wherein each motor per housing comprises:

a stepping motor; and a reference position arrangement.

6. Apparatus as claimed in claim 1, wherein each angle indicator comprises an optically encoded angle indicator.

7. Apparatus as claimed in claim 1, wherein each angle indicator is constituted by a code disposed on the relevant housing, together with means for reading this code.

8. Apparatus as claimed in claim 1, further comprising means for preventing the third rotation axis M from being parallel to the first rotation axis N.

9. Apparatus as claimed in claim 8, wherein the means for preventing comprises mechanical stopping devices.

10. Apparatus as claimed in claim 1, wherein the control means comprises a module for determining a reference signal vector (θ) and a surface position vector (ψ), of an error angle vector (δ), comprising azimuth error angle ($\delta_a$), the elevation error angle ($\delta_e$) and the roll error angle ($\delta_r$) between a coordinate system connected to the object and a required coordinate system from a measuring signal vector (φ).

11. Apparatus as claimed in claim 10, wherein the control means also comprises a module for determining a control signal vector (u) from the error angle vector (δ).

12. Apparatus as claimed in claim 11, wherein u is determined by transfer functions $H_1(s)$, $H_2(s)$ and $H_3(s)$, in which the following applies:

$u_1(s) = H_1(s) \cdot \delta_a(s)$ $u_2(s) = H_2(s) \cdot \delta_e(s) + H_3(s) \cdot \delta_r(s)$ $u_3(s) = H_2(s) \cdot \delta_e(s) - H_3(s) \cdot \delta_r(s)$ $H_1(s)$, $H_2(s)$ and $H_3(s)$ being at least first-order control systems.

13. Apparatus as claimed in claim 1, wherein each angle indicator is constituted by a Gray code disposed on the relevant housing, together with means for reading this Gray code.

* * * * *